(12) United States Patent
Biro et al.

(10) Patent No.: US 11,884,323 B2
(45) Date of Patent: Jan. 30, 2024

(54) METHOD FOR DETERMINING A TURNING RADIUS

(71) Applicant: Lemken Gmbh & Co KG, Alpen (DE)

(72) Inventors: Gyorgy Jozsef Biro, Ladbergen (DE); Christoph Muller, Westerkappeln (DE)

(73) Assignee: Lemken Gmbh & Co KG, Alpen (DE)

( * ) Notice: Subject to any disclaimer, the term of this patent is extended or adjusted under 35 U.S.C. 154(b) by 139 days.

(21) Appl. No.: 17/047,806

(22) PCT Filed: Apr. 16, 2019

(86) PCT No.: PCT/DE2019/100349
§ 371 (c)(1),
(2) Date: Oct. 15, 2020

(87) PCT Pub. No.: WO2019/201394
PCT Pub. Date: Oct. 24, 2019

(65) Prior Publication Data
US 2021/0107565 A1     Apr. 15, 2021

(30) Foreign Application Priority Data

Apr. 18, 2018 (DE) ............... 10 2018 003 170.6
Apr. 8, 2019 (DE) ............... 10 2019 109 191.8

(51) Int. Cl.
*B62D 15/02* (2006.01)
*B62D 13/00* (2006.01)

(52) U.S. Cl.
CPC ........... *B62D 15/028* (2013.01); *B62D 13/00* (2013.01); *B62D 15/024* (2013.01); *B62D 15/025* (2013.01)

(58) Field of Classification Search
CPC .. B62D 15/028; B62D 15/024; B62D 15/025; B62D 13/00
See application file for complete search history.

(56) References Cited

U.S. PATENT DOCUMENTS

| | | | | |
|---|---|---|---|---|
| 4,212,483 A * | 7/1980 | Howard | ................ | B62D 13/06 280/103 |
| 7,694,993 B2 * | 4/2010 | Timmons, Jr. | ......... | B62D 13/06 280/448 |
| 9,096,265 B2 * | 8/2015 | Carr | ....................... | B60D 1/245 |
| 2009/0272551 A1 * | 11/2009 | Thompson | ........... | A01B 69/003 172/278 |
| 2016/0101811 A1 * | 4/2016 | Kyrtsos | ............. | B62D 15/0285 701/25 |

(Continued)

FOREIGN PATENT DOCUMENTS

| EP | 3090922 A1 | 11/2016 | | |
|---|---|---|---|---|
| WO | 2016058595 A1 | 4/2016 | | |
| WO | WO-2016058595 A1 * | 4/2016 | ............. | B62D 13/06 |

*Primary Examiner* — Adam D Tissot
(74) *Attorney, Agent, or Firm* — The Watson IP Group, PLC; Jovan N. Jovanovic (57) ABSTRACT

The present invention relates to a method for determining a turning radius of a trailer attached to a towing vehicle and moved by the latter, comprising a computing unit, which is connected to a measuring sensor system, which transmits sensor data about current movements of the trailer to the computing unit, and which sensor data is considered by the computing unit for the determination of the turning radius. The invention also relates to a trailer, which is equipped with a device, which uses a method of this type.

18 Claims, 5 Drawing Sheets

(56) References Cited

U.S. PATENT DOCUMENTS

2016/0139599 A1* 5/2016 Czlapinski ............. B62D 53/08
        701/41
2017/0247032 A1* 8/2017 Lee ...................... B62D 15/021

* cited by examiner

METHOD FOR DETERMINING A TURNING RADIUS

The present invention relates to a method for determining a turning radius of a trailer attached to a towing vehicle and moved by the latter, comprising a computing unit, which is connected to a measuring sensor system, which transmits sensor data about current movements of the trailer to the computing unit, and which sensor data is considered by the computing unit for the determination of the turning radius. The invention also relates to a trailer, which is equipped with a device, which uses a method of this type.

In the case of trailers, which are moved by a towing vehicle, it is often desirable that the wheels of the trailer follow the track, in which the wheels of the towing vehicle are rolled, as exactly as possible. A large area of application can be found, for example, in agricultural engineering. Trailers, which are provided with their own wheel assembly and which are towed by a tractor and by means of which soil cultivation, seeding, fertilizing, spraying, or harvesting work is performed, are to roll with their wheels as exactly as possible in the track of the tractor, in order to avoid an unnecessary soil compaction and/or damages to the crops. The turning radius, in which the trailer moves, is determined continuously during field work, and is compared to the turning radius of the tractor, in order to actively steer the trailer in such a way that, in the case of deviations, the trajectory thereof approaches or even adapts to the trajectory of the tractor again.

An example for a method of this type is disclosed in document EP 2 145 813 A1. To steer the trailer, the angular speed of the towing vehicle and the path speed of the trailer are determined. A control device controls the steering angle of the steerable axle of the trailer as a function of the measuring values. A gyroscope is used as measuring sensor system for determining the angular speed of the towing vehicle. The path speed of the trailer can be determined by means of speed sensors at at least one wheel.

It is known from document DE 199 42 034 A1 to guide a trailer, which is connected to a tractor via a drawbar, in the tractor track, in that a control device transmits output signals, which the control device has previously determined as a function of sensor signals, to a steering device for the trailer. The signals of a gyroscope for measuring the angular speed of the towing vehicle, a measuring sensor for measuring the hitch angle, the kink angle, or the axle pivoting angle, a sensor for determining the inclination of the trailer, as well as a path sensor, are proposed as sensor signals.

The document EP 2 679 470 B1 discloses a system, which transfers the cornering of the tractor to the trailer via the ISOBUS, and generates the steering signals for steering the trailer therefrom.

In the case of the solutions disclosed in the abovementioned documents, it is required to exchange measuring values and data between the towing vehicle and the trailer, and to evaluate them by means of the control device. An electronic, mechanical, or hydraulic connection to the towing vehicle is required. Due to the fact that in agriculture, many tractors of varying ages, varying makes, and comprising different technical equipment, are operated, to which trailers can be attached, it is uncertain whether a trailer, which has a steering device comprising a control device for track guidance in the tractor track, does in fact receive the sensor data required as part of a data exchange with the tractor from there.

In document EP 3 090 922 A1 it is now proposed for a generic method to detect a movement of the trailer by means of at least one sensor unit, which is functionally and/or spatially assigned only to the trailer, to evaluate the sensor data during a driving movement in order to obtain control data, and to thus guide a trailer in the track of the towing vehicle. It is described that the movement of the trailer is determined by means of at least one gyroscope and/or an acceleration sensor. Inertial sensors and/or sensors for determining the speed and/or acceleration are proposed as further possible sensors. More in-depth explanations as to how the sensor values of these sensors are generated and evaluated are missing. It thus remains open, how a system, which is constructed as cost-efficiently as possible, can be realized with little construction effort.

A device is disclosed in document DE 10 2017 205 291 A1, by means of which movements of an adjusting rod system of an agricultural spreading machine are to be reduced or even completely erased by means of the active control of an actuator. To be able to suitably control the actuator, it is required to determine the speed and/or direction of movement of the trailer.

It is the object of the present invention to propose a method for determining a turning radius of a trailer, which is attached to a towing vehicle and which is moved by the latter, which provides for a reliable and well-functioning steering of the trailer at least approximately in the track of the towing vehicle with a cost-efficient setup.

The object is solved for a generic method, in that the measuring sensor system has sensors, by means of which rotation angles and/or distances covered in a time interval of first and second wheels located on opposite first and second sides of the trailer are measured, the first sensor value from the first wheel on the first side of the trailer is offset against the second sensor value from the second wheel on the second side of the trailer, in order to form a calculated value, and the computing unit offsets the calculated value in consideration of a value for the track width of the first and second wheels, which are compared with one another, to form a value for the current turning radius of the trailer.

The present invention utilizes the path differences between the left and the right wheel of an axle, which occur in response to a cornering, to determine the turning radius of the trailer resulting therefrom. The calculated value can be determined from the difference between the sensor values for the left and right wheel, or it is a quotient, which represents a relation between the speed values. The sensor values are gathered from the sensor data, which is transmitted to the computing unit. When offsetting the calculated value against the track width between the wheels, the turning radius, with which the trailer is moved, is calculated therefrom. The turning radius determined in this way then forms an input value for controlling actuators, which are used to control the trailer. They can be actuators, which are attached, for example, to the drawbar, in order to change the drawbar angle in relation to the towing vehicle, and/or to change the turning angle at the wheels and/or the rotation angle of one or several axles in relation to the trailer, in order to thus follow the towing vehicle so as to be on-track.

The calculation is based on the following formulas:

$$R = \frac{d(v_l + v_r)\cos\alpha}{2(v_r - v_l)}$$

or

-continued $$R = \frac{d(\omega_l + \omega_r)\cos\alpha}{2(\omega_r - \omega_l)}$$

The center of rotation, around which the trailer rotates with the turn radius R for the axle, the wheels of which are measured by means of the sensors, thereby lies in an extension of the rotation axis, around which the measured wheels of the trailer rotate. The values $\omega l$ and $\omega r$ are the values for the rotation angles of the left and right wheels, which are measured in a time interval. d is the track width of the two wheels. $\alpha$ is the average value of the steering angle of the trailer, which is formed from the steering angles for the right and left wheel. vl and yr are the distances right and left, which are measuring in the time interval.

The kink angle between the towing vehicle and the trailer can be calculated according to the following formula:

$$\beta = a\tan\left(\frac{l + R\sin\alpha}{R\cos\alpha}\right)$$

$\beta$ is thereby the kink angle, and l is the distance between the measured trailer axle and the center of rotation, around which the hitch of the trailer drawbar in the trailer coupling of the towing vehicle rotates. However, l can also be the distance between the measured trailer axle and the center of rotation of the rear axle of the towing vehicle, or an assumed value in-between, when the distance between the trailer coupling at the towing vehicle and the center of rotation of the rear axle or the assumed point is small, and only a small error in the calculation of the turning radius thus results therefrom.

When wheels roll straight ahead, the average steering angle $\alpha=0$. This results in the values cos $\alpha=1$ and sin $\alpha=0$. The basic calculation of the turning radius is thus $$R = \frac{d(v_l + v_r)}{2(v_r - v_l)}$$

or $$R = \frac{d(\omega_l + \omega_r)}{2(\omega_r - \omega_l)}$$

Due to the fact that the driven distances as well as the speeds as distances driven in a time interval behave in a constant proportional manner, they shorten beyond the respective fractions.

The proposed method can thus manage without any electronic, mechanical, or hydraulic connection to the towing vehicle in order to determine a turning radius of the trailer. The method provides for the use of a very cost-efficient and widely tested sensor system. The results are cost advantages in the machine production of the trailers, functional advantages by avoiding additional electronic units on the towing vehicle, and advantages during operation and during maintenance of the trailers by means of a simple sensor system.

The computing unit is equipped with a suitable electronic hardware and software, by means of which the proposed method steps can be processed in an automated manner during operation. Running in the manner as described, the software can determine the turning radius of the trailer, by means of which the trailer is moved while being towed behind the towing vehicle. If the turning radius of the trailer is known, the turning radius and thus the driving direction of the towing vehicle can also be determined from further geometric data of the trailer-towing vehicle combination. Based on this data, it is then easy to generate a control signal from the turning radius of the trailer by means of the computing unit, by means of which control signal the trailer can be guided very exactly in the track of the towing vehicle. It is also possible, however, for example to protect the soil, to hold the trailer on a lane, which is laterally offset to the lane of the towing vehicle, based on the data from the computing unit.

In particular the sensory detection of a cornering of a towing vehicle and the on-track steering of a towed vehicle resulting therefrom is possible with the invention with the help of sensors at two wheels of trailer, which are located opposite one another on both vehicle sides, wherein additional sensors and other suitable technical means can optionally be used to improve the accuracy. It is thereby basically irrelevant, whether the trailer is towed by a towing vehicle, in the case of which only the wheels of the front axle can be steered, whether it is a towing vehicle with all-wheel or articulated steering, or whether the towing vehicle runs on crawlers, which are accelerated or decelerated on one or both sides for steering purposes.

The invention can be used for trailers, which are formed as one-axle vehicles or multi-axle vehicles, comprising a large variety of axle and steering assemblies.

The used sensors can in particular be designed as impulse counters, which, in response to a rotation of the evaluated wheel, count the number of the impulses measured thereby in a time interval. The impulse counters can operate according to any physical principles, there are, for example, optical, electrical, or mechanical impulse counters. For example, perforated or toothed disks or toothed rings, which are scanned in a contactless manner via an induction or Hall sensor, can be used as impulse generators on a respective wheel, or other measuring systems are used, by means of which impulses can be queried during a rotational movement of a wheel. When a wheel is equipped, for example, with an impulse counter, which supplies 36 impulses in response to a complete rotation of the wheel by 360°, an impulse corresponds to a rotation of the evaluated wheel by 10°. In the case of, for example, twelve impulses, a first wheel evaluated by a sensor has traveled by a third of its circumference. Depending on the radius and the resulting circumference of the wheel, which is monitored by the sensor, the measured twelve pulses can be converted quickly into a covered distance in cm or m.

If sixteen impulses were measured simultaneously for the second wheel in this example, it is clear that the second wheel rotates quicker and is located on the outside of the turn. If the first wheel is on the left side of the trailer, viewed in the driving direction, and the second wheel is on the right side, viewed in the driving direction, the trailer moves to the left when cornering. If the distance between the inner and the outer wheel is then also known, the turning radius, with which the trailer is currently moved, can be calculated from these values. The larger the difference between the numbers of the measured impulses, the narrower the turn, and the smaller the turning radius, in which the trailer moves, and the smaller the difference between the impulses of the two monitored wheels, which are counted on the inside of the turn and outside of the turn in a time interval, the more the trailer currently drives straight ahead. If there is no difference, the trailer drives straight ahead.

The impulses can also be generated with a higher or lower resolution, in that the number of the impulse generators is increased or decreased at the monitored wheels. The finer the resolution of the sensors, the more exactly can the turning radius calculated from the sensor values be calculated. In the case of only a single impulse per wheel rotation, the calculated value and thus the calculated current radius is obviously only very inaccurate. In practice, a resolution should be selected, which provides a sufficiently accurate number of impulses during a wheel rotation, which is not clogged with foreign matter even under the harsh operating conditions in the agriculture, and which provides for a good price-performance ratio.

According to a design of the invention, the computing unit considers the direction of movement of the trailer and/or of the first and second wheels for the offsetting. Due to the detection of the direction of movement, evaluation errors are avoided when the wheels rotate in opposite directions or the trailer is moved in reverse by means of the towing vehicle. The detection of the correct direction of movement is also important so as to be able to provide a correct steering signal to the right or to the left. When the sign of a sensor value is not correct as designation for the direction of movement of one or of both wheels, a steering signal, which is generated on the basis of the determined calculated value, could point in exactly the wrong direction.

According to a design of the invention, the first wheel and the second wheel belong to a common axle. Due to the evaluation of the speeds of the wheels at one axle, the calculation of the sensor values is simplified, because no longitudinal offset between the first and second wheel in the driving direction of the trailer has to be considered in the computational model.

According to a design of the invention, the computing unit considers a sensor value for the speed, at which the trailer is moved. Due to the consideration of a sensor value for the speed, the intensity of steering angles can be better adapted to the speed, in order to avoid steering angles, which are too strong or too small, in situations, in which the trailer is to follow steering movements of the tractor.

According to a design of the invention, the computing unit is connected via an interface to an external apparatus, which generates a path signal and transmits the latter to the computing unit, the computing unit compares the transmitted path signal to a calculated value, which was determined from the sensor values for the rotation angle and/or the distance covered in a time interval, and generates a correction signal, against which the sensor values and/or the calculated value are offset, in the case of a difference between the path signal and the value calculated from the sensor values. For example a navigation system or another GNSS system can be considered as external apparatus, which also generates values for the speed, which is currently driven by the towing vehicle, or a module installed in the towing vehicle, such as, for example, speed sensors in the transmission, in the axles, or the wheels, or speed sensors, such as, for example, radar sensors, by means of which the driven speed of the towing vehicle is determined. By means of a comparison of the speed signals generated by these external apparatuses with the calculated value, which likewise represents a value for the currently driven speed, the computing unit can determine whether the wheels of the trailer are afflicted with slip. It is possible via the correction signal to correct slip-related faulty calculated values. Without a correction, faulty values could otherwise result for the calculated turning radius, which could lead to faulty steering signals when slip occurs.

According to a design of the invention, the computing unit uses one or several software-supported probabilistic filters to determine the calculated value. Probabilistic filters serve the purpose of reducing errors in actual measured values, and to provide estimates for non-measurable system variables. It is a condition thereby that the values of interest can be described by a mathematical model, for example in the form of equations of motion. Special mathematical structures, which provide for the use in real time systems of various technical fields, can be used in the filters. The probabilistic filters serve the purpose of avoiding the processing of sensor data or sensor values, which can be classified as being faulty with some certainty. The probabilistic filters can likewise serve the purpose of bridging time-limited failures when determining measured values. The probabilistic filters serve the purpose of smoothing the trajectory of the moving trailer, and to avoid steering movements and extreme steering angles, which appear to be unnormal when tracking the trailer and/or the towing vehicle.

According to a design of the invention, the first and second wheel are actively steered. The active steering can take place, for example, by means of an Ackerman steering, which is adjusted via an actuator, such as, for example, a hydraulic cylinder or an electric servomotor. However, the steering can also be formed as a turntable or drawbar steering, which is actuated via one or several hydraulic cylinders and/or electric servomotors. The steering angle of the first and second wheel is adjusted jointly in this case by means of an actuator. The actuator is controlled by the computing unit.

According to a design of the invention, several values, which are determined in chronological succession, for the current turning radius of the trailer are stored in an electronic memory and are compared to one another by the computing unit. Due to the comparison of the stored values, it can be detected, in which direction the trailer rotates around its vertical axle. If the turning radius becomes narrower over time compared to the measured values, which are compared with one another, the trailer turns in even further. If the measured values, which are compared with one another, remain the same over time, the trailer maintains its turning radius. If the turning radius of the measured values, which are compared with one another, becomes larger over time, the trailer deflects. The dynamic of the cornering determined in this way can be used to balance the current direction of movement with a plan direction of movement. If differences result in response to this comparison, the trailer steering can be used to actively counter-steer, in order to adapt the current direction of movement to the plan direction of movement.

According to a design of the invention, active or passive wheel speed sensors are used as sensors. Wheel speed sensors of this type are used in millions of ways in the vehicle construction, for example in ABS and driving dynamics regulating systems. These wheel speed sensors are available cost-efficiently, are reliable, light, robust, and require little installation space. If a sensor is initially "activated" by applying a supply voltage and then generates an output signal, this sensor is identified as being "active". If a sensor operates without an additional supply voltage, this sensor is identified as being "passive". The passive wheel speed sensors are attached, for example, directly via an impulse wheel, which is connected to the wheel hub. The pole pin, which is surrounded by a winding, is connected to a permanent magnet, the magnetic effect of which reaches all the way to the pole wheel. The rotational movement of the impulse wheel and the change of tooth and tooth gap associated therewith effects a change of the magnetic flux through the pole pin and the winding. This changing magnetic field induces a measurable alternating voltage in the winding. The frequency and amplitudes of this alternating voltage are proportionate to the wheel speed. Inductive passive sensors do not require a separate voltage supply by the computing unit. Due to the fact that the signal range for the signal detection is defined by the computing unit, the amplitude level has to move within a voltage range. The distance between sensor and impulse wheel is specified by the axle construction.

The active sensor is, for example, a proximity sensor comprising an integrated electronic system, which is supplied with a voltage defined by the computing unit. A multi-pole ring can be used, for example, as impulse wheel, which can simultaneously be used in a sealing ring of a wheel bearing. Magnets with alternating pole direction are used in this sealing ring. The magneto-resistive resistances integrated in the electronic circuit of the sensor detect an alternating magnetic field in response to the rotation of the multi-pole ring. The electronic system in the sensor converts this sine signal into a digital signal. The transfer to the computing unit occurs as current signal in the pulse width modulation process. The sensor is connected to the computing unit via a two-pole electric connecting cable. The sensor signal is transmitted simultaneously via the voltage supply line. The other line serves as sensor mass. In addition to magneto-resistive sensor elements, Hall sensor elements are also installed today, which allow for larger air gaps and which react to the smallest changes in the magnetic field. If a steel impulse wheel instead of a multi-pole ring is installed in a trailer, a magnet is additionally attached to the sensor element. If the impulse wheel rotates, the constant magnetic field in the sensor changes. The signal processing and the IC are identical with the magneto-resistive sensor.

Compared to passive sensors, active sensors have a number of advantages. They already provide for a speed detection from the standstill. This already provides for measurements of rotational angle changes at a wheel with speeds starting at 0.1 km/h. The sensors, which operate according to the Hall principle, for example, detect forward and backward movements. The design of the sensor is smaller and lighter. Due to the omission of the impulse wheels, a simplification of the power transmission joints is created. The sensitivity to electromagnetic interferences is smaller. Changes to the air gap between sensor and magnetic ring have no direct impacts on the signal. The active sensors are ultimately also more insensitive to oscillations and temperature fluctuations.

According to a design of the invention, the value for the current turning radius of the trailer is offset against a setpoint control signal to an actuator, which is part of a device for steering the trailer. The value for the currently driven turning radius determined by means of cost-efficient, yet reliable sensors, forms a good database, in order to steer a trailer therewith. Depending on whether the turning radius of the trailer is to remain the same, is to be increased, or decreased, in order to follow a towing vehicle in a track specified by said towing vehicle, or to drive next to the lane of the towing vehicle, the setpoint control signals to the actuator, by means of the actuation of which the turning radius remains the same or is changed, can be calculated on the basis of the current values of the turning radius, on which the trailer currently moves, which is determined according to the method according to the invention.

It is to be considered thereby that the towing direction, with which the towing vehicle pulls on the drawbar of the trailer, exerts a direct influence on the driving direction, with which the trailer moves. If the direction, in which the towing vehicle drives changes, the towing direction, in which the trailer is towed, also changed automatically. Depending on the steering strategy, whether the trailer is to thereby continue to follow the track of the towing vehicle or is to continue to drive next to the track of the towing vehicle, this results in consequences for the setpoint control signal to the actuator. If the turning radius is known, on which the trailer currently moves, it is possible to also determine the current turning radius, on which the towing vehicle moves, based on further geometric data, in particular the distance value from the center of rotation of the rear axle of the towing vehicle to the coupling point at the towing vehicle for attaching the drawbar of the trailer. If the currently driven turning radius of the towing vehicle as well as the currently driven turning radius of the trailer are known, it is possible to determine therefrom a matching setpoint control signal for controlling the actuator for actuating the steering of the trailer. Due to the fact that the computing unit continuously evaluates the sensor values transmitted to it, calculates the turning radius of the trailer, and outputs setpoint control signals to the actuator of the steering device of the trailer, this is a dynamic system, which continuously adapts the setpoint control signals to the actuator to the calculated demand at a high clock rate, and updates the setting of the steering to the calculated demand in this way.

A trailer towed by a towing vehicle can steer automatically via the generation of setpoint control signals to an actuator, without having to be supported by the towing vehicle thereby. It is possible to equip the trailer with a steering system, which steers the trailer on a desired lane. The steering of the trailer is thus independent of the respectively leading towing vehicle. Any towing vehicles can thus be positioned in front of the trailer, without thereby changing the steerability of the trailer. The trailer can thus be used in a highly flexible manner. This is also particularly advantageous when a tractor implement management system is present in the trailer. Plans for working the respective agricultural surface, which are to be completed by the tractor-trailer combination, can be stored in the tractor implement management system. The plans can be, for example, a route planning, according to which the respective field is worked. Spreading quantities can also be determined in the plans. To stick exactly to the plans during the ongoing work, the autonomous steerability of the trailer is advantageous. It is also possible to use the steerable trailer in combination with a program, in the case of which the attached machine controls the tractor, such as, for example, the forward speed, the driving direction, the height control of positioning cylinders of the tractor hydraulic, and the like. For an exact surface coverage of the worked surface, it can thus be advantageous when the trailer controls the tractor, in particular when the work tools are to be moved exactly along the side edge of the previously worked surface.

According to a design of the invention, the device for steering the trailer has at least one steering angle sensor, by means of which values for the respectively current steering angle of the steering device are determined, the determined values of the steering angle sensor are transmitted to the computing unit, the computing unit compares the values of the steering angle sensor to the setpoint control signals, and, in the case of a difference between the values of the steering angle sensor and the setpoint control signal, generates a correction value, by which the setpoint control signal is changed. The steering angles on the inside of the turn and on the outside of the turn can be different thereby. Measured steering angles of the respective wheels can be considered in this case as representative steering angle via an average value or a correction calculation. A dimension of an actuator can likewise be detected, which represents a steering angle via a mechanical or hydraulic translation. Via the steering angle sensor, the computing unit can detect the respective currently set steering direction, into which the steering device of the trailer steers. The current steering position of the steering device can then be included in the setpoint control signal to the actuator, as a result of which steering movements are smoothed, and an overall calmer steering behavior is attained.

According to a design of the invention, the computing unit also determines the turning radius of the towing vehicle from further geometric data of the towing vehicle-trailer combination in response to a cornering, in addition to the turning radius of the trailer, and calculates the setpoint control signals to the actuator of the device for steering the trailer in such a way that the turning radius of the trailer adapts to the turning radius of the towing vehicle. When the towing vehicle and the trailer move with the identical turning radii, the trailer inevitably runs in the track of the towing vehicle. The distance from the center of rotation of the rear axle to the coupling point at the towing vehicle and/or the distance from the coupling point at the towing vehicle to the center of rotation of the trailer, and/or the distance of the center of rotation of the trailer to the center of rotation of the towing vehicle can be considered as further geometric data of the trailer-towing vehicle combination. The geometric data of the respective used towing vehicle can be stored in a table in the computing unit of the trailer, or a manual input option for inputting the geometric data of the towing vehicle in the software of the computing unit is predetermined.

According to a design of the invention, the computing unit also determines the turning radius of work tools at the trailer from further geometric data of the towing vehicle-trailer combination, in response to a cornering, in addition to the turning radius of the trailer, and calculates the setpoint control signals to the actuator of the device for steering the trailer in such a way that the turning radius of the work tools adapts to the turning radius of the towing vehicle. Depending on the function of the trailer, it can be desirable not to control the trailer with its wheels, but with the work tools following the track of the towing vehicle. A control of this type can be advantageous when the work tools perform, for example, a soil cultivation, a sowing, a fertilization, or spread plant protection agents. When the trailer is controlled with the wheels following the track of the towing vehicle in the case of such work, strips, which remained unworked, can result on the field between working tracks located next to one another, in particular in response to a cornering. The effect here is that, depending on the function of the trailer, a significant distance can exist between the axle of the chassis and an attachment, due to which a lateral offset results between the track of the towing vehicle and the work tools in response to a cornering. This can apply in particular to order combinations, in the case of which several functional modules were combined to form a trailer, which is towed by a towing vehicle, in order to simultaneously perform several partial processes in one operation. A combined harrow, sowing device, and a fertilizing device, can be one example of an order combination. Significant lengths of the trailer can result here. An expedient selection has to be made here, with regard to which work tools of the order combination are significant for the track guidance of the trailer by the computing unit.

According to a design of the invention, the sensor values or the value for the current turning radius of the trailer are offset against a setpoint control signal to an actuator, which is part of a device for erasing oscillations of the trailer or of components of the trailer. In this design of the invention, an actuator can also be an element comprising an adaptively settable spring and/or damping rate.

Oscillatory movements of trailers and/or the components thereof during the working of agricultural surfaces are unwanted. The oscillations stress the components, can build up and intensify, and they make a precise performance of the work, which is to be performed with the trailer, more difficult. The sensor values relating to the current wheel speeds or the value for the current turning radius of the trailer can be used to detect and to possibly also predict the rolling and yaw movements of the trailer and/or of parts of its setup, such as, for example, the distributing rod of a field sprayer. Rotational and lateral acceleration forces, which act on the trailer and the components thereof, can be calculated from the sensor values for the speed of the first and second wheels and the turning radius of the trailer. The sensor values and/or the value of the current turning radius can be further offset into a control command to the actuator via a corresponding control algorithm. Current sensor values are thereby advantageously compared with previous sensor values, in order to detect dynamic changes in the movements of the trailer. The oscillatory movements of the trailer and/or of its components can be reduced or even completely erased by means of control commands to the actuator.

According to a design of the invention, a configuration option is provided for changing stored data for distances between centers of rotation. Due to the change option, stored data can be adapted to changed distances, which can result, for example, when the towing vehicle is replaced by a different towing vehicle. The trailer can thus be operated with different towing vehicles. The only adaptation, which has to be made in order to provide for a perfect track tracking even in the case of changing towing vehicles, is the input of the changed distance measurements.

According to a design of the invention, the alignment of the longitudinal vector of the towing vehicle is defined as function from the rotation angle and/or distance difference of the wheels of the trailer by using the resulting distance in the measured time interval as average value of the wheel speeds and the distance of the axle of the trailer to the rear axle or to the center of rotation in the center of the rear axle of the towing vehicle. The alignment of the longitudinal vector of the towing vehicle can be determined by the computing unit by means of a corresponding mathematical equation.

According to a design of the invention, the turning radius of the towing vehicle around its central center of rotation results as function from the alignment of the longitudinal vector of the towing vehicle, the distance of the trailer coupling to the center of rotation of the rear axle, and the turning radius of the trailer. The alignment of the turning radius of the towing vehicle can be determined by the computing unit by means of a corresponding mathematical equation.

Further features of the invention follow from the claims, the figures, and the figurative description. All of the features and feature combinations mentioned above in the description as well as the features and feature combinations mentioned below in the figure description and/or shown in the figures alone, cannot only be used in the respective specified combination, but also in other combinations or alone.

The invention will now be described in more detail on the basis of a preferred exemplary embodiment as well as with reference to the enclosed drawings, in which.

Figure 1:
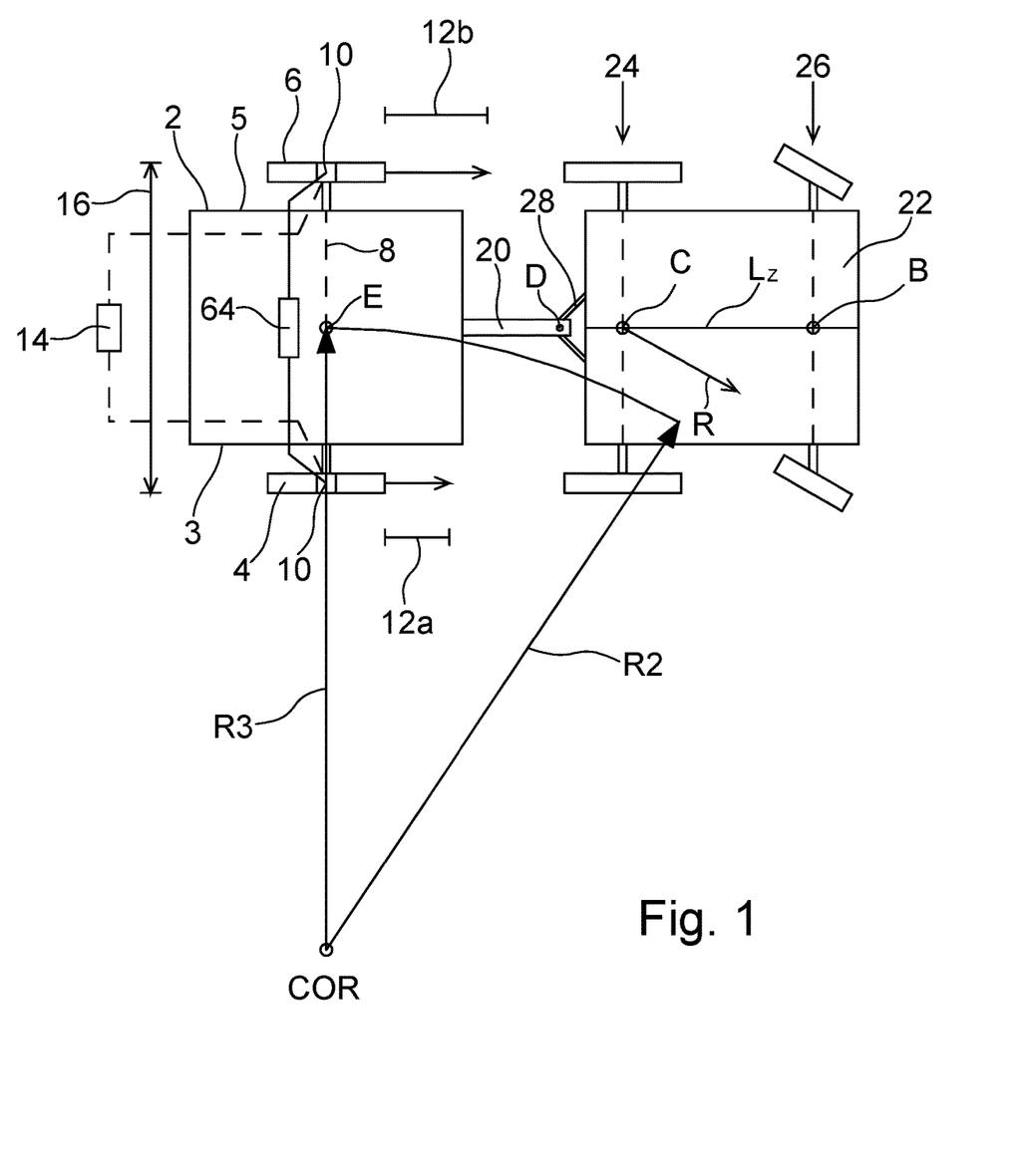
FIG. 1: shows a schematic diagram of a trailer with towing vehicle.

A trailer 2, which is attached to a towing vehicle 22, is illustrated in a schematic diagram in FIG. 1. The right wheel 4 is located on the first side 3 of the trailer 2, the left wheel 6 is located on the left side, as second side 5 viewed in the driving direction. Both wheels can be suspended individually, but they can also be connected to one another via a common axle 8. Sensors 10, by means of which rotation angles 34 covered in a time interval can be measured as values ωr and ωl and/or distances 12 as values vl and vr, which are calculated as values in the above-specified formulas, are located in the wheel hubs of the wheels 4, 6. The sensor values generated in this way are transferred via a connecting cable or also via radio to a computing unit 14, which is preferably arranged on the trailer 2. A suitable software, which offsets the sensor values, is installed in the computing unit 14. The software stored in the computing unit 14 has information relating to the track width 16 of the trailer. The turning radius R3, by which the trailer 2 currently rotates around a center of rotation COR, can be calculated from the offsetting of the sensor values against the sensors 10 with the track width 16 of the trailer 2, which is considered in the above-specified formulas with the value d.

The trailer 2 is connected to the towing vehicle 22 via a drawbar 20. The towing vehicle 22 has a rear axle 24 as well as a front axle 26. In the exemplary embodiment in FIG. 1, the wheels of the front axle 26 are turned to the right. When the towing vehicle 22 drives in front into the direction of forward travel R, the trailer 2 is also pulled to the right at the drawbar. Different distances 12 or rotation angles 34, respectively, thereby result for the wheels 4, 6, which the latter cover. While the right wheel 4 covers a shorter distance 12a in a right turn, the left wheel 6 rolls over a longer distance 12b in response to such a cornering. By a comparison of the two distances 12 by forming a difference or a quotient, the angle, by which the current forward direction of travel of the trailer 2 deviates from a straight travel, can be determined according to the above-specified formulas. When the calculated value from the comparison of the sensor values is also set off against the track width 16, an exact measure for the turning radius R3 can be specified. The wheels 4, 6 are illustrated in neutral steering position, but can be steered to the right or left by an actuator 64.

Figure 2:
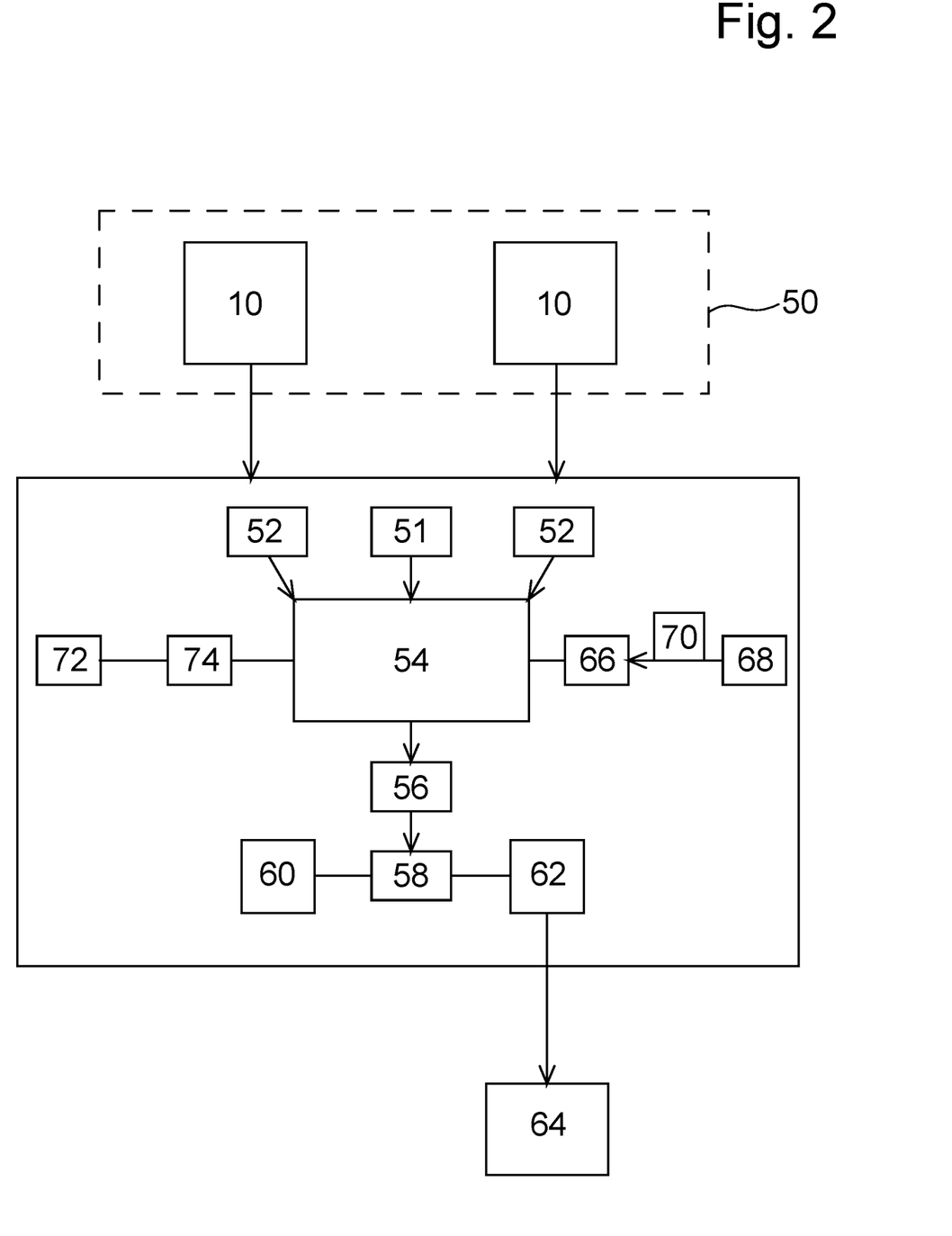
FIG. 2: shows a schematic diagram of the data processing in the computing unit.

A schematic diagram of the data processing in the computing unit is shown in FIG. 2. In the exemplary embodiment, the measuring sensor system 50 consists of the two sensors 10, which are attached at the right or left wheel 4, 6, respectively. The sensors 10 transmit sensor data 52, which includes sensor values, which represent a rotation angle (34) and/or a distance, to the computing unit 14. A software program 54, which also has access to a value 51 for the track width of the trailer 2, is present on the computing unit 14. From the comparison of the sensor values from the sensor data 52, the software program 54 calculates a calculated value 56, by means of which differences in the rotation angles 34 or the distances 12, respectively, between the left and right wheel 4, 6 can be detected. The software program 54 further offsets the calculated value 56 against the value 51 for the track width of the trailer 2, in order to form the value 58 for the turning radius R3 therefrom. The value 58 can be stored in a memory 60. However, the software program 54 can also be programmed in such a way that it also calculates a setpoint control signal 62 from the value 58, which is transferred to an actuator 64, which is part of a steering of the trailer 2, as already described in FIG. 1. The trailer 2 can be steered arbitrarily via a drawbar steering, Ackerman steering, rotation of the axle 8 around a rotation axis, or in another way via an actuator 64.

The computing unit 14 is connected via an interface 66 to an external apparatus 68, which generates a path signal 70 and transmits the latter to the computing unit 14, the computing unit 14 compares the transmitted path signal 70 to a calculated value, which was determined from the sensor values for the rotation angle 34 and/or the distance 12 covered in a time interval, and generates a correction signal, by means of which the sensor data and/or the calculated values are offset, in the case of a difference between the path signal 70 and the value calculated from the sensor values.

The computing unit 14 can moreover be connected via an interface 74 to a steering angle sensor 72, by means of which a current turning angle of the steering device or a drawbar angle is measured, by which the drawbar 20 of the trailer 2 is positioned relative to the central longitudinal axis of the towing vehicle 22. The signal of the steering angle sensor 72 can be further processed in the calculation steps by the software installed on the computing unit 14.

If the trailer 2 is towed in a turn, the distance covered by the wheel at the inside of the turn is shorter than the distance covered by the wheel at the outside of the turn. In the method according to the invention, the current turning radius R3 of the trailer 2 results from the difference of the distances 12a, 12b of both wheels 4, 6 and the track width 16. This means that the turning radius R3 of the trailer 2 is a function of the rotation angle difference of the wheels 4, 6, which are located opposite one another on both trailer sides, and the track width 16.

The basic difference between the rotation angles 34 of the wheels 4, 6, which are located at the trailer 2, is measured permanently in short time intervals and with high resolution, in order to be able to determine the current turning radius R3 in a high-frequency manner. If the resolution is too inaccurate in certain individual cases, the rate of the rotation of the trailer along the turning radius, which is to be determined, can be detected by means of a sensory device, and can be used for the plausibility test and as correction variable for accurately calculating the turning radius. The measurements are electronically evaluated in a computing unit 14, which has an electronic evaluation system comprising a software program 54, and are converted into a value 58 for the turning radius R3 with the help of the trailer geometry. The distance L2 from the center of rotation C of the rear axle 24 to the coupling point D at the towing vehicle 22 is thereby optionally set additionally as correction value in the electronic evaluation system, in order to improve the accuracy. This can also be disregarded, however, in the case of a towing vehicle 22, such as a tractor, comprising large wheels and trailer coupling almost directly at the rear axle.

Figure 3:
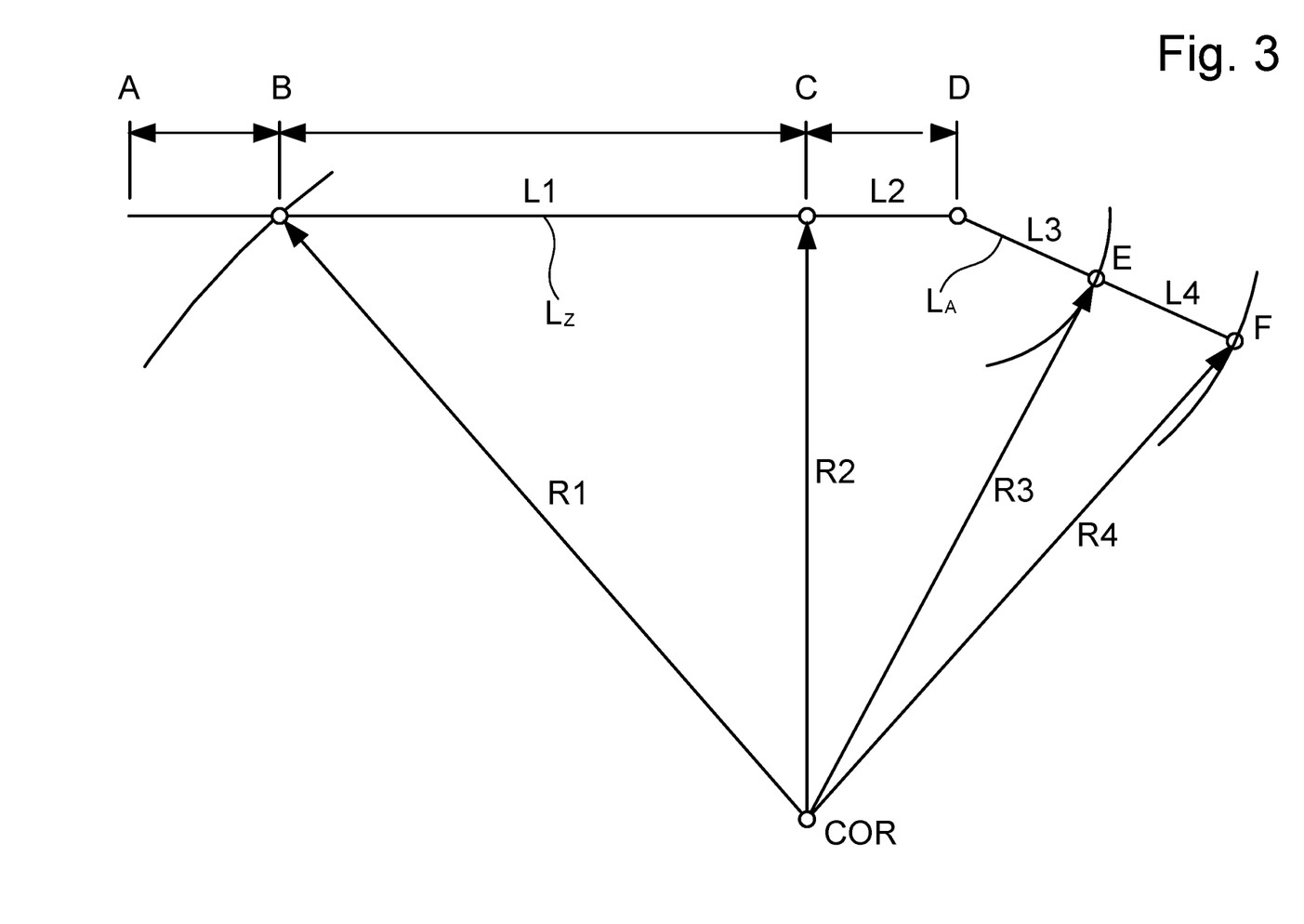
FIG. 3: shows a schematic diagram of the geometric proportions, which influence the turning radius of a towed trailer.

FIG. 3 shows the geometric proportions of the vehicle combination, which influence the cornering of a trailer 2.

A stable and defined geometry or kinematic, respectively, exists between the trailer coupling 28 at the towing vehicle 22 and the wheel suspensions of the wheels 4, 6 of the trailer 2, which are located opposite one another on both vehicle sides 3, 5. The line A-D identifies the longitudinal axis of the towing vehicle 22. The distance A-B marks the distance between the front of the towing vehicle and the center of the front axle. The towing vehicle 22 has the relevant points center front axle, or the center of rotation in the case of several steered front axles, as point B, center rear axle between the wheels located opposite one another in the case of an individual rear axle, or the center of rotation of the rear axle combination in the case of several rear axles, as point C, and the center of rotation D in the trailer coupling 28, in which the drawbar of the trailer 2 is attached to the towing vehicle 22, and by which the hitch of the drawbar 20 rotates around the suspension pin of the trailer coupling 28. In the exemplary embodiment shown in FIG. 3, the center of the axle 8 of the trailer 2 represents the center of rotation E of the trailer 2. A work tool 32, the position of which along the longitudinal axis of the trailer 2 is identified by the point F, is also located at the trailer 2. L1 identifies the distance between the center of rotation of the front axle B and the center of rotation of the rear axle C. Due to the fact that the trailer coupling 28 is normally assembled behind the rear axle 24, L2 identifies the distance of the rear axle center of rotation C to the trailer coupling D. The trailer 2 has the length, which is identified with L3, of the distance from the center of rotation D in the trailer coupling 28 of the towing vehicle 22 to the center of rotation E of the trailer axle 8. L4 identifies the distance of the work tool 32, which is arranged at the trailer 2, from the trailer axle 8 with the center of rotation E. It can be seen from the view in FIG. 3 that the turning radius R3 around the central center of rotation COR, with which the trailer axle 8 is moved in the exemplary embodiment, is smaller than the turning radius R4, which the work tool 32 follows in its point F. It follows from this that in response to the curve path of the trailer 2 shown in FIG. 3, the axle 8 of the trailer 2 approximately follows the track of the rear axle of the towing vehicle 22, because the turning radius R2 is approximately identical to the turning radius R3. The work tool 32, however, would follow the rear axle of the towing vehicle 22 with a slight offset towards the outside of the turn, because the turning radius R4 is larger than the turning radius R2.

If the track of the trailer 2 is to exactly follow the track of the towing vehicle 22, the cornering of the towing vehicle 22 has to be reproduced mathematically, so that the trailer 2 can be actively steered accordingly. The method for determining the active steering direction for the trailer 2 is based on the fact that a cornering of the towing vehicle 22 via the trailer coupling 28 impacts the angle of attack (drawbar angle) between towing vehicle 22 and trailer 2.

The turning radius of the towing vehicle 22 follows from the spatial-geometric orientation of the towing vehicle 22 to the trailer 2. Said orientation is characterized by the longitudinal axis $L_Z$ of the towing vehicle 22 along the line A-D in FIG. 3 and the angle to the longitudinal axis $L_A$ of the trailer 2 along the line D-E in FIG. 3. The spatial position of the longitudinal axis $L_Z$ corresponds to the longitudinal vector, in the direction of which the towing vehicle 22 moves during an observation time.

The relative spatial position of the longitudinal axis $L_Z$ of the towing vehicle 22 to the longitudinal axis $L_A$ of the trailer 2 results as function from the rotational angle and/or distance difference of the wheels 4, 6 of the trailer 2 by using the resulting distance 12 in the measured time interval as average value of the rotation angles 34 and/or distances 12, and the distance of the axle of the trailer 2 to the rear axle or to the center of rotation C in the center of the rear axle 24 of the towing vehicle 22.

The turning radius of the towing vehicle 22 around its central center of rotation results as function from the longitudinal axis $L_Z$ of the towing vehicle 22, the length L2 as distance between the center of rotation D of the trailer coupling 28, and the center of rotation C of the rear axle 24, and the turning radius R3 of the trailer 2.

The turning radius R2 of the rear axle 24 and the turning radius R1 of the front axle 26 of the towing vehicle 22 result as function from the above-described turning radius of the towing vehicle 22 by including the static distances L1 and L2.

In practice, for example in agricultural applications, the track of the rear axle 24 of the tractor as towing vehicle 22 is preferably selected as reference track, thus a trajectory along a turning radius R2 around the central center of rotation in FIG. 3. The method also works with towing vehicles 22 comprising all-wheel steering, in the case of which R1 and R2 in FIG. 3 are identical.

The electronic evaluation system in the computing unit 14 determines the resulting distance 12 in the measured time interval of the towing vehicle-trailer combination from the sensor values of the sensors 10 of both sides 3, 5. It then controls the actuator 64 of the steering of the trailer 2 by means of a setpoint control signal 62 in such a way that, after covering a route, which corresponds to the distance between the rear axle 24 of the towing vehicle 22 and the axle 8 or the axle center E in the case of several axles at the trailer 2, it steers exactly the turning radius, which was measured exactly at that point of the route, at which the wheels of the towing vehicle 22 have passed this point. The trailer 2 thus drives correctly in the track of the towing vehicle 22. Predictive algorithms, such a Kalman filters or extended Kalman filters, are preferably used for this purpose.

In the case of this method, the axle 8 of the trailer 2, the wheels 4, 6, or the drawbar 20 does not need to be rigid. They can also be steered actively, when the trailer 2 is to trail on-track with the towing vehicle 22. This applies equally for all or for a portion of the axles 8, when the trailer 2 has several axles 8.

It goes without saying that the method according to the invention cannot only be used for a towing vehicle-trailer combination as a combination of a towing vehicle 22 and a single trailer 2, but likewise for steering several axles 8 at a multi-axle trailer 2 as well as tracking control of several trailers 2 or independent vehicles one behind the other.

The coupling of the vehicles thereby does not need to be mechanically rigid, but can also be designed as buffer comprising payout measurement. In the alternative, the vehicles can also drive freely one behind the other ("platooning"), wherein a distance measurement is to exist between the vehicles. This distance measurement can also take place indirectly via radio navigation or, e.g., GNSS systems.

Further values, such as, e.g., the exact slip-free towing vehicle-trailer combination speed can likewise be included in the calculation as correction values. They can be provided, for example, by the towing vehicle 22 for each electronic bus system.

The system for implementing the above-described method uses the sensors 10 at the wheels 4, 6, which can also be designed, for example, as odometer, tachometer, or encoder. Additional, optional sensors can optionally be present. An evaluation and electronic control system is further present, which is preferably installed on the trailer 2, optionally together with further sensors, which are necessary for the track guidance, or control electronics for the steering. However, it can also be arranged on the towing vehicle 22 in an electronic apparatus, which is already present for the trailer 2 or the attached apparatus.

The method can provide a configuration option for setting L1 and L2, e.g. via a display at the electronic evaluation or control system of the trailer 2 or via an electronic data line to the towing vehicle 22, or via a simple analog controller, such as a potentiometer at the electronic system.

According to the method, the actuators of the steering provided on the trailer side can also be controlled in order to steer the trailer. This can take place, for example, via a pulse width modulation of signals or via black-white as well as analog signals, which control, for example, hydraulic or pneumatic electromagnetic valves or electric servomotors. A control via bus signals, such as, for example, via a CAN bus, is also provided.

Figure 4:
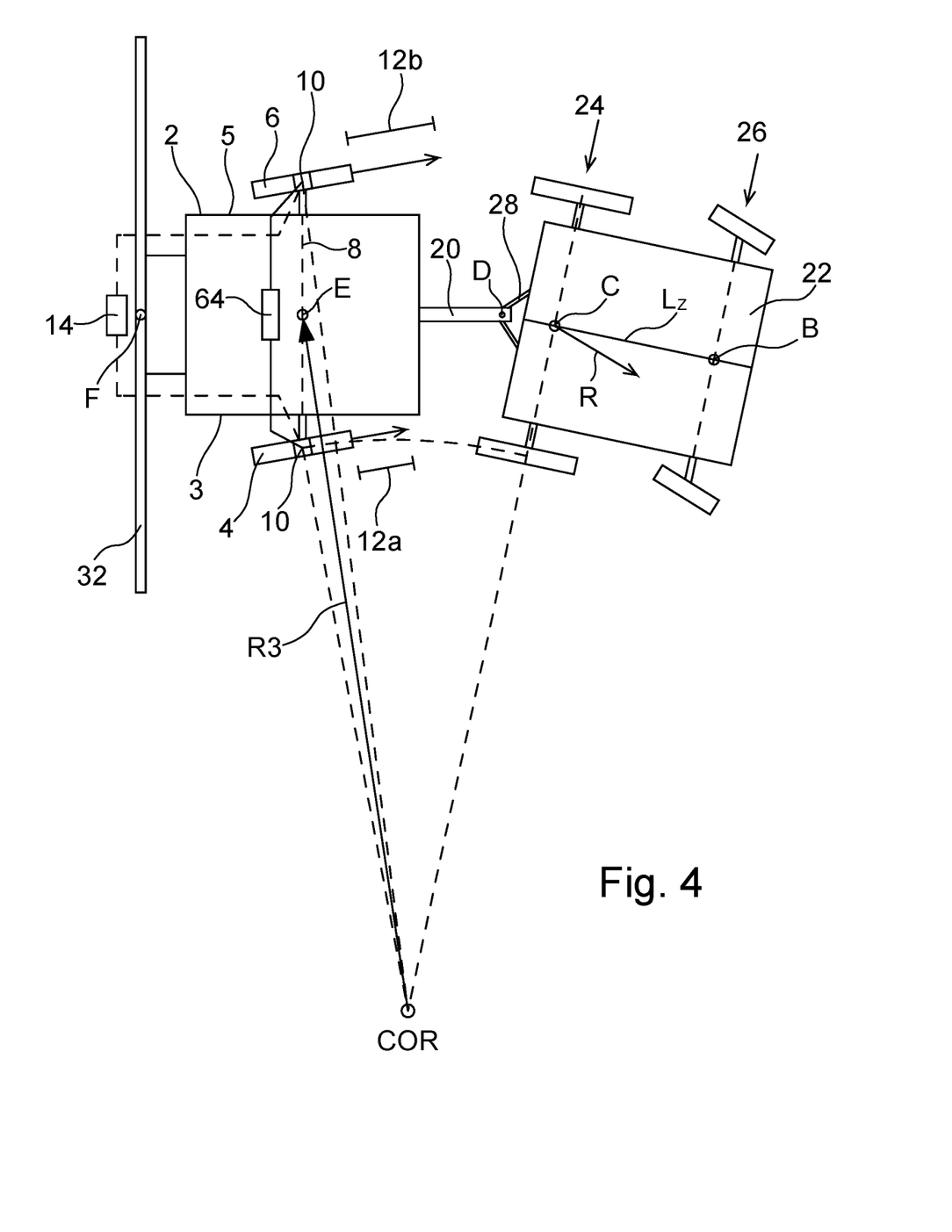
FIG. 4: shows a schematic diagram of a towing vehicle-trailer combination consisting of towing vehicle and trailer comprising work tools in response to a cornering.

An exemplary embodiment is shown in FIG. 4, in the case of which the actuator 64, which is controlled by the computing unit 14, turns the wheels 4, 6 in order to steer the trailer 2 in a steering angle to the longitudinal axis of the trailer 2, in the case of which identical lengths of the turning radii R2, R3 to the centers of rotation C or E, respectively, in relation to the central center of rotation COR result. The on-track trailing of the wheels 4, 6 to the wheels of the rear axle 24 of the towing vehicle 22 is suggested by means of the dashed turns. A sprue is also suggested in FIG. 4 as example for a work tool 32, the center point F of which is on the longitudinal central axis of the trailer along the line D-E-F.

Figure 5A:
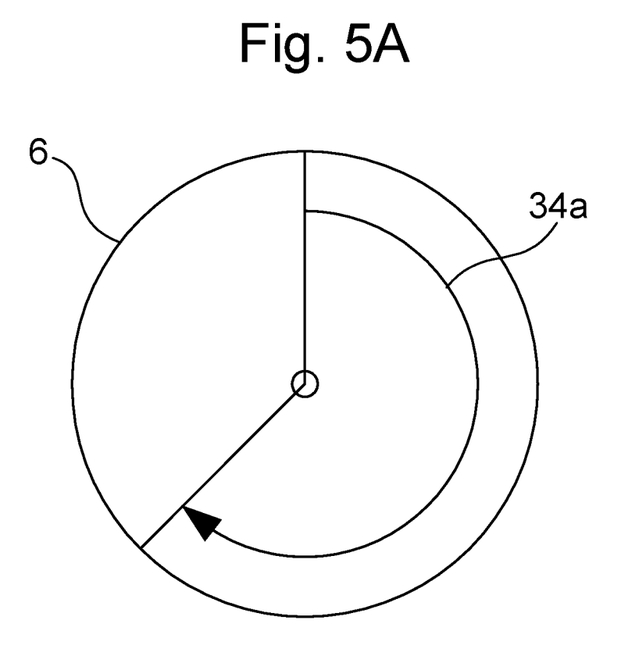
FIG. 5a, 5b show the rotation angles of the wheels, which differ in response to a cornering.
Figure 5B:
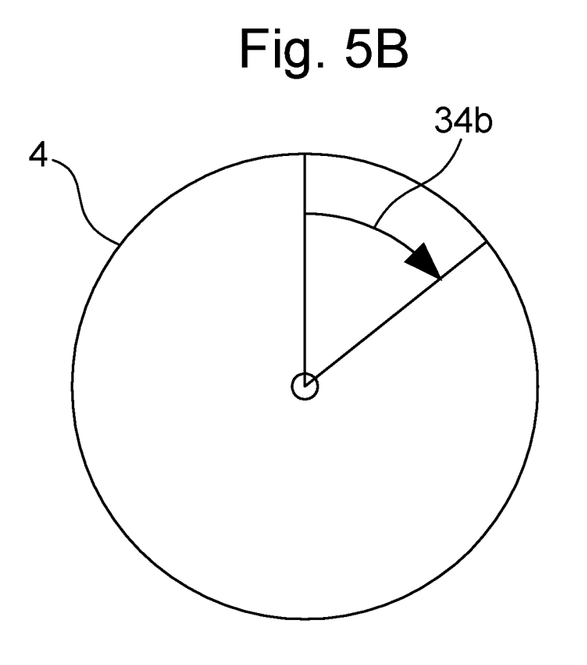

The rotation angles 34 of the wheels 4, 6 are shown in FIG. 5a, 5b, which differ in response to cornering in a time interval, in which the rotation angles are measured. The rotation angles 34a, 34b, which are measured by the sensors in a time interval, are offset as values ωr and ωl according to the above-specified formula. While the larger rotation angle 34a of the wheel 6 on the outside of the turn from FIG. 4 is shown in FIG. 5a, FIG. 5b shows the smaller rotation angle 34b of the wheel 4 on the inside of the turn. The distances 12a, 12b of different lengths, which are illustrated in FIG. 4, result from the different rotation angles 34a, 34b, which are measured in a time interval.

The invention is not limited to the above exemplary embodiments. It is not difficult for the person of skill in the art to modify the exemplary embodiments in a manner, which appears to be suitable to him, in order to adapt them to a concrete application.

The invention claimed is:

1. A system for determining a turning radius (R3) of a trailer (2) attached to a towing vehicle (22) and moved by the latter, comprising a computing unit (14), which is connected to a measuring sensor system (50), wherein the computing unit and measuring sensor system function independently of the towing vehicle and where the measuring sensor system transmits sensor data (52) to the computing unit (14) about current movements of the trailer (2), and which sensor data is considered by the computing unit (14) for the determination of the turning radius (R3) based on sensor data obtained solely from the movements of the trailer, characterized in that the measuring sensor system has sensors (10), by means of which at least one of rotation angles (34) and distances (12) covered in a time interval of first and second wheels (4, 6) located on opposite first and second sides (3, 5) of the trailer (2) are measured, the first sensor value from the first wheel (4) on the first side (3) of the trailer (2) is offset against the second sensor value from the second wheel (6) on the second side (5) of the trailer (2), in order to form a calculated value (56), and the computing unit (14) offsets the calculated value (56) in consideration of a value (51) for the track width (16) of the first and second wheels (4, 6), which are compared with one another, to form a value (58) for the current turning radius (R3) of the trailer (2), wherein the system operates without requiring an electronic connection between the towing vehicle (22) and trailer (2).

2. The system according to claim 1, characterized in that the computing unit (14) considers at least one of the direction of movement of the trailer (2) and of the first and second wheels (4, 6) for the offsetting.

3. The system according to claim 1, characterized in that the first wheel (4) and the second wheel (6) belong to a common axle (8).

4. The system according to claim 1, characterized in that the computing unit (14) considers a sensor value for the speed, at which the trailer (2) is moved.

5. The system according to claim 1, characterized in that the computing unit (14) is connected via an interface (66) to an external apparatus (68), which generates a path signal (70) and transmits the latter to the computing unit (14), the computing unit (14) compares the transmitted path signal (70) to a calculated value, which was determined from the sensor values for at least one of the rotation angle (34) and the distance (12) covered in a time interval, and generates a correction signal, against which at least one of the sensor data and the calculated value are offset, in the case of a difference between the path signal (70) and the value calculated from the sensor values.

6. The system according to claim 1, characterized in that the computing unit (14) uses software-supported probabilistic filters to determine the calculated value.

7. The system according to claim 1, characterized in that the first and second wheel (4, 6) are actively steered.

8. The system according to claim 1, characterized in that several values (58), which are determined in chronological succession, for the current turning radius (R3) of the trailer (2) are stored in an electronic memory (60) and are compared to one another by the computing unit (14).

9. The system according to claim 1, characterized in that active or passive wheel speed sensors are used as sensors (10).

10. The system according to claim 1, characterized in that the value (58) for the current turning radius (R3) of the trailer (2) is offset against a setpoint control signal (62) to an actuator (64), which is part of a device for steering the trailer (2).

11. The system according to claim 10, characterized in that the device for steering the trailer (2) has a steering angle sensor (72), by means of which values for the respectively current steering angle of the steering device are determined, the determined values of the steering angle sensor (72) are transmitted to the computing unit (14), the computing unit (14) compares the values of the steering angle sensor (72) to the setpoint control signals (62), and, in the case of a difference between the values of the steering angle sensor (72) and the setpoint control signal (62), generates a correction value, by which the setpoint control signal (62) is changed.

12. The system according to claim 10, characterized in that, in addition to the turning radius (R3) of the trailer (2), the computing unit (14) also determines the turning radius (R1, R2) of the towing vehicle (22) from further geometric data of the towing vehicle-trailer combination in response to a cornering, and calculates the setpoint control signals (62) to the actuator of the device for steering the trailer (2) in such a way that the turning radius (R1, R2) of the trailer (2) adapts to the turning radius (R3) of the towing vehicle (22).

13. The system according to claim 1, characterized in that, in addition to the turning radius (R3) of the trailer (2), the computing unit (14) also determines the turning radius (R4) of work tools (32) at the trailer (2) from further geometric data of the towing vehicle-trailer combination, in response to a cornering, and calculates the setpoint control signals (62) to the actuator of the device for steering the trailer (2) in such a way that the turning radius (R4) of the work tools (32) adapts to the turning radius (R1, R2) of the towing vehicle (22).

14. The system according to claim 1, characterized in that the sensor values or the value (58) for the current turning radius (R3) of the trailer (2) are offset against a setpoint control signal (62) to an actuator (64), which is part of a device for erasing oscillations of the trailer (2) or of components of the trailer (2).

15. The system according to claim 1, characterized in that a configuration option is provided for changing stored data for distances (L1, L2, L3, L4) between centers of rotation (B, C, D, E, F).

16. The system according to claim 1, characterized in that the alignment of the longitudinal vector of the towing vehicle (22) is defined as function from at least one of the rotation angle and distance difference of the wheels (4, 6) of the trailer (2) by using the resulting distance (12) in the measured time interval as average value of at least one of the rotation angles (34) and distances (12) and the distance of the axle (8) of the trailer (2) to the rear axle (24) or to the center of rotation (C) in the center of the rear axle (24) of the towing vehicle (22).

17. The system according to claim 1, characterized in that the turning radius (R1, R2) of the towing vehicle (22) around its central center of rotation results as function from the alignment of the longitudinal vector of the towing vehicle (22), the distance of the trailer coupling (28) to the center of rotation (C) of the rear axle (24), and the turning radius of the trailer (2).

18. A trailer (2), which is equipped with a device, which includes the system for determining a turning radius (R3) of a trailer (2) attached to a towing vehicle (22) and moved by the latter, characterized in that the system is designed according to claim 1.

* * * * *